United States Statutory Invention Registration [19]

[11] Reg. Number: H341

Mongeon [43] Published: Oct. 6, 1987

[54] DUAL MODE SCANNER/TRACKER

[75] Inventor: Robert J. Mongeon, S. Windsor, Conn.

[73] Assignee: The United States of America as represented by the Secretary of the Army, Washington, D.C.

[21] Appl. No.: 669,912

[22] Filed: Nov. 9, 1984

[51] Int. Cl.[4] ..... G01C 3/08; G01B 11/26; G01C 1/00

[52] U.S. Cl. ..... 356/152; 356/5; 250/203 R

[58] Field of Search ..... 356/152, 5; 89/41.06; 250/203

[56] References Cited

U.S. PATENT DOCUMENTS

| | | | |
|---|---|---|---|
| 3,977,628 | 8/1976 | Barron | 356/152 |
| 4,401,886 | 8/1983 | Pond et al. | 356/152 |
| 4,572,662 | 2/1986 | Silverman | 356/152 |

*Primary Examiner*—Stephen C. Buczinski
*Assistant Examiner*—Melissa L. Koltak
*Attorney, Agent, or Firm*—Sheldon Kanars; Jeremiah G. Murray; Robert A. Maikis

[57] ABSTRACT

The beam of a laser radar is moved over the field of view by means of a pair of scanner/trackers arranged in cascade along the laser beam. One of the scanner/trackers operates at high speed, with high resolution and a narrow field and is located in the demagnified portion of the laser beam. The other scanner/tracker operates at low speed with low resolution and a wide field and is located in the magnified portion of the laser beam. The two scanner/trackers complement each other to achieve high speed, high resolution scanning as well as tracking of moving targets. A beam steering telescope for an airborne laser radar which incorporates the novel dual mode scanner/tracker is also shown.

7 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DUAL MODE SCANNER/TRACKER

The Government has rights in this invention pursuant to contract DAAB07-76-C-0920, awarded by the Department of the Army.

BACKGROUND OF THE INVENTION

This invention relates to optical radar of the type which illuminates targets by means of a laser beam and derives target information from the reflected laser beam. Such radars usually include a scanning and tracking capability. The scanning system moves the transmitted laser beam over the field of view, usually in some systematic manner, for example with a sawtooth scan system of the type used in television or with spiral type scanning. If such a radar is provided in addition with a tracking capability for moving targets, the scan format must be randomly programmable so that random target movements can be followed.

Scanner/trackers for laser beams may include a coarse scanner, for example a wide angle, low speed, low resolution scanner; with a narrow field, high resolution, high speed dither scanner in series with the coarse scanner. With such a dual mode scanner/tracker system, the coarse scanner may for example scan in a sawtooth fashion with gaps between the scanning lines, with the high speed dither scanner filling in the gaps. Thus the two scanners complement each other. In the tracking mode both of these scanner/trackers move in a programmed coordinated manner to achieve target tracking.

Scanners of this type usually achieve laser beam movement by means of moving optics such as rotating prisms or wedges through which the beam passes or electrically driven moving mirrors from which the beam is reflected. High speed tracking, such as is required for the aforementioned dither scanner/tracker requires extremely high power if the moving optics are located at a point where the laser beam has its largest diameter. Laser radars normally include a means to expand the beam diameter before transmission to improve angular resolution or provide greater range.

SUMMARY OF THE INVENTION

The present invention comprises a dual mode scanner/tracker in which the high speed, narrow field, high resolution, scanner/tracker is located in the demagnified portion of the laser beam where power requirements for the smaller moving optics are moderate, with the coarse, wide field, low resolution scanner/tracker located in the magnified or large diameter portion of the laser beam.

The invention also comprises a beam steering telescope adapted for mounting on an aircraft and comprising a rotating turret which includes a dual mode scanner/tracker of the type described above, together with the beam expanding telescope. The beam steering telescope is thus capable of scanning its field of view 360° in azimuth while the dual mode scanner/trackers are operating.

It is thus an object of the invention to provide a dual mode scanner/tracker for an optical radar which includes a high speed, high resolution, narrow field scanner/tracker located in the demagnified portion of the laser beam of said radar, and a wide field, low speed, low resolution scanner/tracker located beyond the beam expanding telescope of said optical radar, whereby said two scanner/trackers are designed to coordinate with each other to provide high speed high resolution scanning of the radar's wide field of view and efficient tracking of randomly moving targets.

Another object of the invention is to provide a beam steering telescope for airborne radar which includes a rotatable turret including a dual mode scanner/tracker and a beam expanding telescope, with the beam expanding telescope mounted between the two scanner/trackers, one of said scanner/trackers being a high speed, high resolution, narrow field scanner/tracker which is located in the demagnified or narrow beam side of said beam expanding telescope, and the other of said scanner/trackers being a wide field low resolution, low speed scanner/tracker located on the other side of said beam expanding telescope in the magnified or wide beam area of said laser radar.

A still further object of the invention is to provide a scanner/tracker for an optical radar which achieves high resolution, high speed, wide angle, and low access time scanning and tracking with minimum power required to operate the scanning mechanisms.

These and other objects and advantages of the invention will become apparent from the following detailed description and the drawings.

DETAILED DESCRIPTION OF A PREFERRED EMBODIMENT

Figure 1:
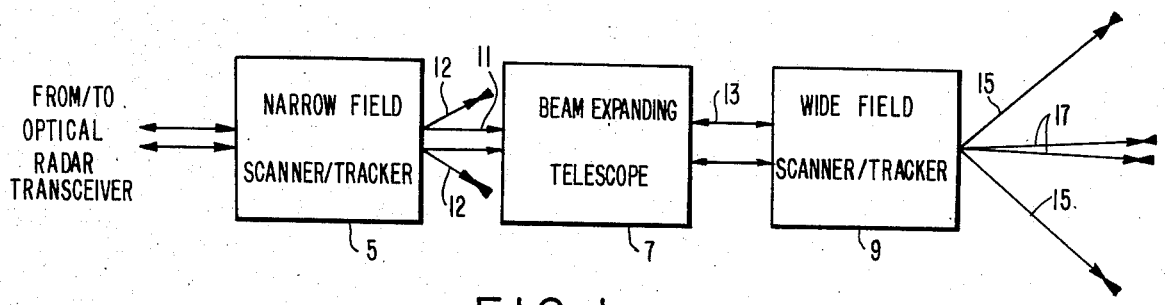
FIG. 1 is a block diagram illustrating the concept of the novel dual mode scanner/tracker.

The diagram of FIG. 1 shows a portion of an optical radar including narrow field scanner/tracker 5, a beam expanding telescope 7 which receives the output of scanner/tracker 5 and applies the expanded laser beam 13 to wide field scanner/tracker 9, which radiates the laser beam into space, and receives laser target echoes. The narrow field scanner/tracker receives the narrow transmitted laser beam from the optical radar transceiver circuitry to the left thereof, not shown, and also applies the target echo signals passing therethrough to said radar circuitry.

A known method of achieving efficient scanning/tracking of optical radar beams is to provide two scanner/trackers in series or cascade along the beam with one scanner/tracker having a wide field of view, for example 60°, low resolution and low scanning speed. Such a scanner/tracker must necessarily be located in the wide or expanded beam region of the laser beam. The low resolution and low scanning speeds result in moderate power requirements for moving the necessarily large optics over such a large field of view. The low speed and low resolution of such a scanner/tracker can be enhanced by a narrow field, high resolution, high speed scanner/tracker in series therewith, with the beam movements of the two scanner/trackers designed to complement each other. For example, the narrow field scanner/tracker may have a 1° field of view, referenced to the optical system output, which means that this scanner/tracker is capable of high speed, high resolution movement of the beam over this angle anywhere within the large field of view of the wide field scanner/-tracker. In FIG. 1, the angle 15 at the radar system output indicates the overall wide field of view of the radar with the smaller angle 17 representing the field of view due to the action of the narrow field scanner/-tracker. For example the angle 15 may be 60° and the angle 17, 1°. The narrow field scanner/tracker could be located in the wide or expanded portion of the laser beam to the right of the beam expanding telescope, however the size of the moving optics required for such a location would have to be at least equal to the beam size. Since moments of inertia of reciprocating or rotating mirrors or prisms go up with the square of the diameters thereof, the power requirements for achieving high speed, high resolution performance even over a small angle can be prohibitive. Significant power and consequent weight saving can be realized by locating the narrow field scanner/tracker in the narrow or demagnified portion of the laser beam, to the left of the beam expanding telescope as shown in FIG. 1. At this location, the scanner/tracker optics can be scaled down to the approximate diameter of the narrow or demagnified laser beam, however the scanned field of view must be increased by the magnification of the beam expanding telescope. For example, if the telescope 7 of FIG. 1 has an afocal magnification of 20, the beam 13 in the output thereof will have a diameter 20 times the diameter of the beam 11 applied thereto from scanner/tracker 5, but the scan field of the expanded beam 13 will be reduced from the angle 12 at the telescope input, also by a factor equal to the telescope magnification. Thus if the scan field or angle 17 at the radar's output is to be 1° in this example, the scanner/tracker 5 would be required to scan the beam 11 over the angle 12 equal to 20°. Even with this larger scan field, the reduced size of the optics for the narrow field scanner/tracker results in power and weight savings.

Figure 2:
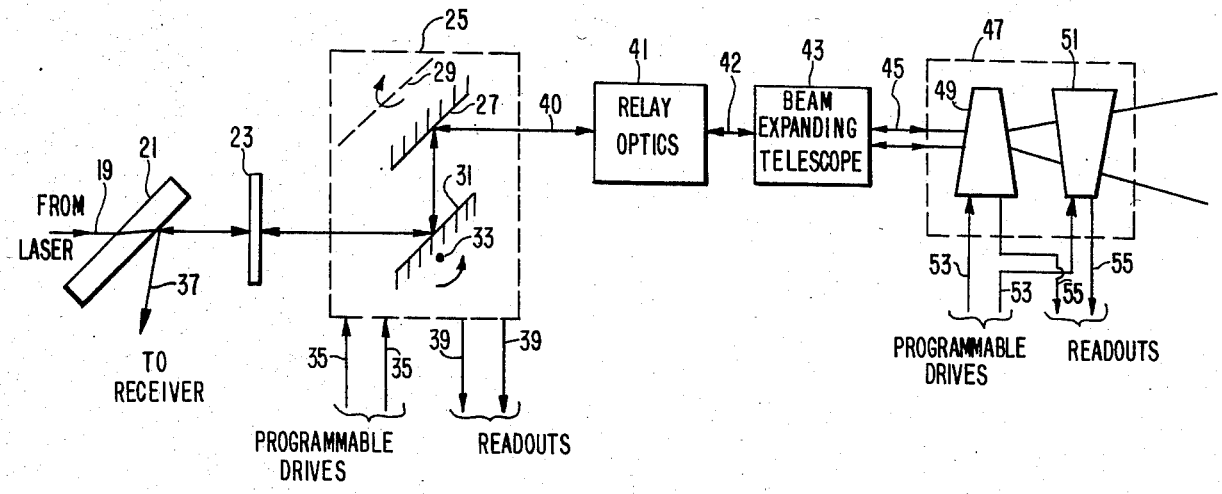
FIG. 2 shows one way in which the novel concept of FIG. 1 can be implemented.

The diagram of FIG. 2 is one example of how the concept of FIG. 1 can be implemented. In FIG. 2, a portion of the optical radar circuitry is shown, including an optical duplexer 21 which directs the target echoes 37 to a receiver, not shown, and passes the narrow transmitted laser beam 19 to the narrow field scanner/-tracker 25 via quarter wave plate 23. The high speed, narrow field, high resolution scanner/tracker 25 utilizes a pair of electrically driven reciprocating mirrors 27 and 31 which rotate around orthogonal axes 29 and 33 respectively to produce scanning or tracking with a bandwidth from dc to over 1.0 kHz. The mirrors are electrically driven as indicated by the arrows 35 labelled "Programmable Drives" and readouts 39 are provided for indicating instantaneous mirror positions. Such a scanner/tracker may have a 1° scan field, referred to the radar system output, with $3\times10^3$ elements per field (circular field with a diameter of 64 elements) and frame time of 1/30 second. The effective aperture may be 0.5 cm. with 0.02° random access resolution and 0.26 milliseconds random access time.

The output beam 40 of scanner/tracker 25 is applied to the input of the beam expanding telescope 43 via relay optics 41. The relay optics may be required to keep the wide scan angle output of the scanner/tracker 25 within the small entrance pupil of telescope 43. The details of the relay optics and telescope are illustrated in more detail in FIG. 3. The output beam 45 of telescope 43 will be a wide beam, for example 10 cm. in diameter if the narrow beam 40 is 0.5 cm. in diameter and telescope 43 has a magnification of 20. Also the relatively wide scan field angle of the beam 40 will be reduced by this factor of 20, for example from 20° to 1° in the telescope output.

The wide field scanner/tracker 47 may comprise a pair of in-line rotating wedges or prisms 49 and 51 with apertures or diameters sufficient to accommodate the magnified scanned laser beam applied thereto from telescope 43. Such a rotating wedge scanner can have a total field of view of 60° with 0.6° random access resolution and a 20 milliseconds response time. The wedges 49 and 51 are separately driven as indicated by the arrows 53 labelled "Programmable Drives" and each has separate readouts 55 for indicating the position thereof. These versatile programmable scanner/trackers may be provided with a 16 bit optical shaft encoder as part of the readout system thereof for accurately monitoring the instantaneous scanner line of sight to within the diffraction limited resolution of the radar, which is approximately 250 microradians. Further details of such rotating wedge programmable scanner/trackers will be found in a co-pending application Ser. No. 377,727, entitled PROGRAMMABLE SCANNER/-TRACKER, Filed on May 13, 1982.

Dual in-line optical wedges may also be used for the narrow field high speed scanner 25, because of their superior performance in high vibration environments, for example such as would occur in an optical radar installed in a helicopter. Small aperture wedges for such an application would be competitive in frequency response to the reciprocating mirrors shown, but would require more signal conditioning to realize a tracking capability because of their non-linear transfer function.

Also, rather than using a pair of reciprocating mirrors for the scanner/tracker 25, single mirror could be used, mounted on dual gimbals which are separately driven by the x and y scanning signals. This arrangement may obviate the necessity for the relay optics 41.

Figure 3:
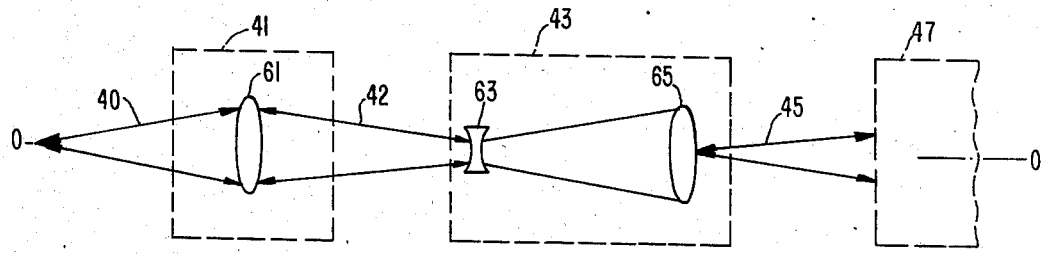
FIG. 3 shows additional details of the apparatus of FIG. 2.

The details of the relay optics 41 and the telescope 43 are shown in FIG. 3. As can be seen the beam expanding telescope may comprise merely a pair of lenses 63 and 65 arranged along the optical axis O—O. A beam directed into ocular or entrance pupil 63 will emerge from the objective lens 65 expanded in diameter and with a reduced scan field, as explained above. The relay optics 41 may comprise, for example, merely a single positive lens 61 positioned so that the narrow laser beam 40 from scanner/tracker 25 is concentrated at the entrance pupil 63 of the telescope 43, indicated by the converging rays 42.

Figure 4:
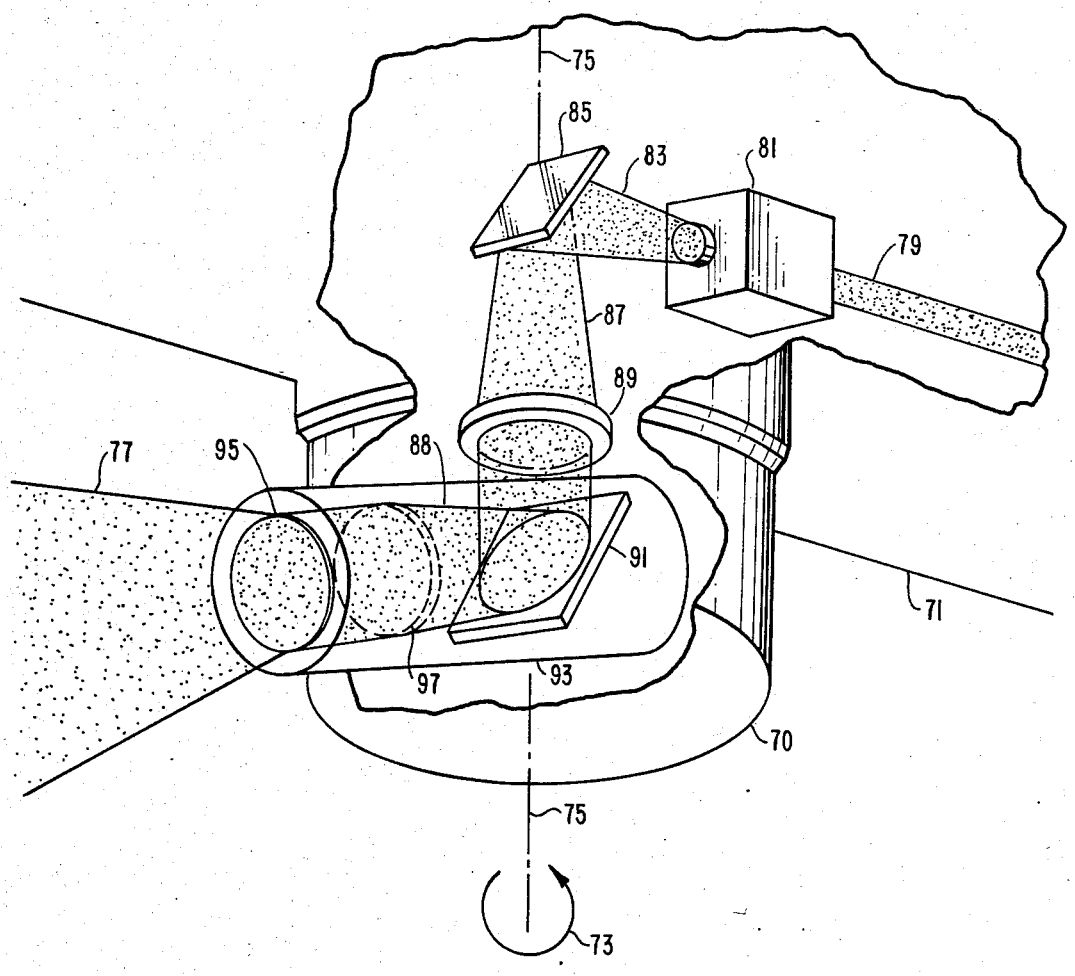
FIG. 4 is a pictorial view of a beam steering telescope in which the novel dual mode scanner/tracker is integrated with the beam expanding telescope of the optical radar.

FIG. 4 shows a beam steering telescope which embodies the dual scanner/tracker of the present invention mounted in a rotatable turret 70 which is mounted on the underside of an aircraft 71. In this embodiment the narrow field scanner/tracker is integrated with the beam expanding telescope to reduce the number of optical components. The narrow laser beam 79 is applied to device 81 which includes both the narrow field scanner/tracker as well as the relay optics, if necessary, and the ocular lens of the beam expanding telescope, such as lens 63 of FIG. 3. The beam 83 emerging from device 81 is reflected from fixed 45° mirror 85 which is mounted along the axis of rotation 75 of turret 70. The beam 87 then passes through the telescope objective lens 89 and is turned by another 90° by means of a second 45° mirror 91. The beam 88 then passes through the wide angle scanner/tracker which may comprise the two rotating wedges 95 and 97 plus ancillary apparatus, not shown, and emerges into space as the scanning beam 77. The arrow 73 represents the rotation of the turret around the axis 75.

While the invention has been described in connection with illustrative embodiments, obvious variations therein will occur to those skilled in this art, accordingly the invention should be limited only by the scope of the appended claims.

What is claimed is:

1. A dual mode scanner/tracker system for an optical radar, said radar comprising a laser beam having magnified and demagnified portions, a first programmable scanner/tracker located in said demagnified portion of said laser beam, said first scanner/tracker being high speed, high resolution and having a narrow field, a second programmable scanner/tracker located in the magnified portion of said laser beam, said second scanner/tracker being low speed, low resolution and having a wide scan angle, said two scanner/trackers being each driven by programmable drives which complement each other to produce efficient scanning of said laser beam and efficient tracking of randomly moving targets in the field of view of said optical radar.

2. The system of claim 1 wherein said first and second scanner/trackers are separated by a beam expanding telescope, said beam expanding telescope comprising an entrance pupil.

3. The system of claim 2 wherein said first scanner/-tracker comprises a pair of orthogonally mounted, electrically driven reciprocating mirrors which produce linear sawtooth scanning with a bandwidth from zero to 1.0 kHz, relay optics located at the output of said first scanner/tracker arranged to constrain the output of said first scanner/tracker to the said entrance pupil of said beam expanding telescope, said second scanner/tracker comprising a pair of in-line, transparent, rotating wedges or prisms, said wedges having separate programmable drives and separate readouts for indicating the instantaneous wedge positions.

4. A beam steering telescope forming part of an airborne optical radar, comprising; an aircraft, a rotating turret mounted on the underside of said aircraft, said beam steering telescope comprising a first high speed, high resolution and narrow field programmable scanner/tracker located in the demagnified portion of the laser beam of said optical radar, the output of said first scanner/tracker being applied to a beam expanding telescope the output of which is a magnified laser beam, a fixed 45° mirror arranged to direct the said output of said beam expanding telescope along the axis of rotation of said turret to another fixed 45° mirror which directs said expanded beam through a second programmable scanner/tracker which has a wide field, low resolution, and low scanning speed.

5. The beam steering telescope of claim 4 wherein said first scanner/tracker is integrated with said beam expanding telescope.

6. The beam steering telescope of claim 4 wherein said first scanner/tracker comprises a pair of orthogonally mounted electrically driven reciprocating mirrors and said second scanner/tracker comprises a pair of transparent rotating wedges through which the said magnified laser beam passes.

7. A dual mode scanner/tracker system for an optical radar, said radar comprising a laser beam having magnified and demagnified portions, a first programmable scanner/tracker located in said demagnified portion of said laser beam, said first scanner/tracker being high speed, high resolution and having a narrow field; a second programmable scanner/tracker located in the said magnified portion of said laser beam, said second scanner/tracker being lower speed, lower resolution and having a wider scan angle, relative to the same characteristics of said first scanner/tracker.

* * * * *